(12) United States Patent
Nishi

(10) Patent No.: US 10,459,446 B2
(45) Date of Patent: Oct. 29, 2019

(54) AUTONOMOUS OPERATION VERIFICATION DEVICE AND AUTONOMOUS SYSTEM

(71) Applicant: Hitachi, Ltd., Chiyoda-ku, Tokyo (JP)

(72) Inventor: Masataka Nishi, Tokyo (JP)

(73) Assignee: HITACHI, LTD., Chiyoda-Ku, Tokyo (JP)

( * ) Notice: Subject to any disclaimer, the term of this patent is extended or adjusted under 35 U.S.C. 154(b) by 216 days.

(21) Appl. No.: 15/550,415

(22) PCT Filed: Feb. 12, 2015

(86) PCT No.: PCT/JP2015/053724
§ 371 (c)(1),
(2) Date: Aug. 11, 2017

(87) PCT Pub. No.: WO2016/129067
PCT Pub. Date: Aug. 18, 2016

(65) Prior Publication Data
US 2018/0032079 A1 Feb. 1, 2018

(51) Int. Cl.
G05D 1/02 (2006.01)
B60W 30/09 (2012.01)
B60W 50/00 (2006.01)
G08G 1/16 (2006.01)
G05D 1/00 (2006.01)

(52) U.S. Cl.
CPC ......... *G05D 1/0214* (2013.01); *B60W 30/09* (2013.01); *B60W 50/00* (2013.01); *G05D 1/0088* (2013.01); *G08G 1/16* (2013.01); *G08G 1/165* (2013.01); *G08G 1/166* (2013.01); *G05D 2201/0213* (2013.01)

(58) Field of Classification Search
CPC .................. G05D 1/0214; G05D 1/0088
USPC .............................................. 701/23
See application file for complete search history.

(56) References Cited

U.S. PATENT DOCUMENTS 7,295,925 B2 * 11/2007 Breed .................. B60N 2/2863
701/301
9,983,553 B2 * 5/2018 Nishi .................. G05D 1/0088

* cited by examiner

*Primary Examiner* — Kira Nguyen
(74) *Attorney, Agent, or Firm* — Foley & Lardner LLP

(57) ABSTRACT

A mechanism having an autonomous operation verification device having a function of determining satisfiability of expected operation and safety requirement under a predetermined operation-time precondition and determining occurrence possibility of hazard violating the safety requirement in a predictive manner and achieving operation safety of an autonomous system operating in an open environment is provided. A function for determining whether the expected operation and operation safety are satisfiable or not in a case where operation planning means provides a planned operation and evaluating the operation safety of the planned operation during operation is provided. Further, an autonomous system having a function of calculating an alternative operation by using the predictive determination function and recovering operation safety by avoiding the hazard is provided.

5 Claims, 14 Drawing Sheets

FIG. 2

FUNCTIONS OF SATISFIABILITY DETERMINATION UNIT AND INPUT AND OUTPUT INFORMATION

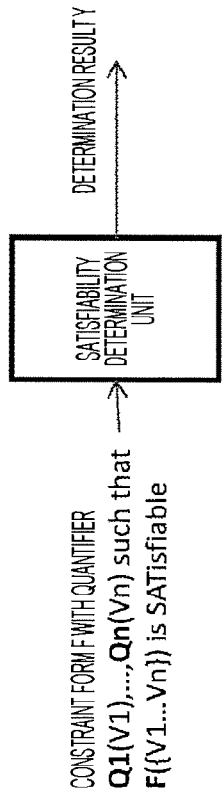

CONSTRAINT FORM F WITH QUANTIFIER
Q1(V1),...,Qn(Vn) such that → SATISFIABILITY DETERMINATION UNIT → DETERMINATION RESULT
F({V1...Vn}) is SATisfiable

| EXPRESSION | EXPLANATION |
|---|---|
| V1 TO Vn | LIST OF VARIABLES CONSTITUTING CONSTRAINT FORM. THIS TAKES EITHER DISCRETE VALUE OR CONTINUOUS VALUE. |
| F | BOOLEAN-VALUED FUNCTION YIELDING TRUE OR FALSE IN RETURN FOR SPECIFIC VALUE OF VARIABLES V1 TO Vn. THIS MAY BE CONSTITUTED BY CONNECTING MULTIPLE OTHER BOOLEAN-VALUED FUNCTIONS WITH LOGICAL SUM AND LOGICAL PRODUCT. |
| Q1(V1),...,Qn(Vn),F({V1...Vn}) | GENERAL FORMAT OF CONSTRAINT FORM F WITH QUANTIFIER |
| Q1 TO Qn | QUANTIFIER. ANY ONE OF ∀ (FORALL, FOR ANY GIVEN VARIABLE), ∃ (EXISTS), AND ¬∃ (NOT EXISTS) HAVING LOGICAL NEGATION OPERATOR ¬. |
| DETERMINATION RESULT | {SATisfiable, SPECIFIC ALLOCATION VALUE OF X1 TO Xn WHICH ARE SATISFYING SOLUTION} {UNSATisfiable, NO SATISFYING SOLUTION} |

CLEARLY INDICATE THAT THERE IS A METHOD FOR MECHANICALLY ELIMINATING QUANTIFIER, AND ULTIMATELY REDUCED TO SAT

AVOIDANCE AND HAZARD FACTOR

FIG. 4

DEFINITION OF VARIOUS KINDS OF VARIABLE VALUES

| | SYMBOL | SUPPLEMENT |
|---|---|---|
| INTERNAL STATE VALUE x[k] OBTAINED WITH INTERNAL STATE MEASUREMENT MEAN | $X = \{ x[k] \mid k = T_{past},...,0,...,T_{future} \}$ | TIME-SERIES VALUE OF STATE VARIABLE VALUE GROUP CHARACTERIZING THE STATE OF THE SYSTEM IN QUESTION (ACCELERATION, SPEED, ABSOLUTE AND RELATIVE SEAT POSITION, POSTURE ANGLE, POSTURE ANGULAR VELOCITY, AND THE LIKE) |
| OPERATION CONTROL COMMAND VALUE OF SYSTEM IN QUESTION | $USYS = \{ usys[k] \mid k = T_{past},...,0,...,T_{future} \}$ | VARIABLE VALUE THAT CAN BE SET BY SYSTEM IN QUESTION TO CHANGE STATE VARIABLE VALUE OF SYSTEM IN QUESTION |
| EXTERNAL STATE VALUE z[k] OBTAINED BY EXTERNAL STATE MEASUREMENT MEANS | $Z = \{ z[k] \mid k = T_{past},...,0,...,T_{future} \}$ | TIME-SERIES VALUE OF STATE VARIABLE VALUE GROUP CHARACTERIZING THE STATE OF SURROUNDING MOVING OBJECT AND OPERATION ENVIRONMENT |
| OPERATION CONTROL COMMAND VALUE OF SURROUNDING MOVING OBJECT | $UDYN = \{ udyn[k] \mid k = T_{past},...,0,...,T_{future} \}$ | VIRTUAL VARIABLE VALUE GROUP REALIZING EXTERNAL STATE VALUE ROW OF SURROUNDING MOVING OBJECT |

FIG. 5
LIST OF INPUT INFORMATION INTO
AUTONOMOUS OPERATION VERIFICATION DEVICE

|  | CONSTRAINT FORM OF INPUT INFORMATION (BOOLEAN-VALUED FUNCTION YIELDING EITHER TRUE OR FALSE) |
|---|---|
| OPERATION-TIME CONSTRAINT OF SYSTEM IN QUESTION | F_constraint(X,Z,USYS) |
| NORMAL-TIME PRECONDITION OF SURROUNDING MOVING OBJECT | F_assumption(X,Z,UDYN) |
| WORST-TIME PRECONDITION OF SURROUNDING MOVING OBJECT | F_assumptionWorst(X,Z,UDYN) |
| PLANNED OPERATION | F_plan(X,USYS) |
| EXPECTED OPERATION | F_command(X,USYS) |
| SAFETY OPERATION | F_safety(X,Z,USYS) |

FIG. 6

EXAMPLE OF CONSTRAINT FORM WITH QUANTIFIER GENERATED BY CONSTRAINT FORM CONVERSION UNIT

| | CONSTRAINT FORM OF INPUT INFORMATION (BOOLEAN-VALUED FUNCTION YIELDING EITHER TRUE OR FALSE) | EXAMPLE |
|---|---|---|
| OPERATION-TIME CONSTRAINT OF SYSTEM IN QUESTION | F_constraint(X,Z,USYS) | $[\forall k \in [0,...,T],$ <br> $(-0.1 <= usys[k+1] - usys[k] <= 0.1) \&$ <br> $(-1.0 <= usys[k] <= +1.0) \&$ <br> $(-x[k+1] + x[k] + f(x[k+1], usys[k+1]) == 0)]$ |
| NORMAL-TIME PRECONDITION OF SURROUNDING MOVING OBJECT | F_assumption(X,Z,UDYN) | $[\forall k \in [0,...,T],$ <br> $(-0.02 <= usys[k+1] - usys[k] <= 0.02) \&$ <br> $(-0.2 <= usys[k] <= +0.2) \&$ <br> $(-z[k+1] + z[k] + fdyn(z[k+1], udyn[k+1]) == 0)]$ |
| WORST-TIME PRECONDITION OF SURROUNDING MOVING OBJECT | F_assumptionWorst(X,Z,UDYN) WHERE CONSTRAINT FORM LIMITS TO RANGE WHICH SATISFIES $\forall$ {X,Z,UDYN}, [ F_assumptionWorst(X,Z,UDYN)=true ] = [ F_assumption(X,Z,UDYN)=true] | $[\forall k \in [0,...,T],$ <br> $(-0.1 <= udyn[k+1] - udyn[k] <= 0.1) \&$ <br> $(-1.0 <= udyn[k] <= +1.0) \&$ <br> $(-z[k+1] + z[k] + fdyn(z[k+1], udyn[k+1]) == 0)]$ |
| PLANNED OPERATION | F_plan(X,USYS) | $[\forall k = 0...T, \|x[k] - path[k]\| < \varepsilon ]$ |
| EXPECTED OPERATION | F_command(X,USYS) | $[\exists k, x[k] \in GoalCondition ]$ |
| SAFETY OPERATION | F_safety(X,Z,USYS) | $[\forall k = 0...T, > SafetyCondition(x[k], z[k], \|x[k] - z[k]\|)]$ |

FIG. 7

CONSTRAINT FORM WITH QUANTIFIER OUTPUT BY CONSTRAINT FORM CONVERSION UNIT

{ ∀UDYN | F_assumption (X,Z,UDYN) }, { ∃USYS | F_constraint(X,Z,USYS)}, such that
F_plan(X,USYS)=true && F_command(X,USYS)=true && F_safety(X,Z,USYS)=true is SATisfiable

FIG. 8(a)

EXAMPLE OF CONSTRAINT FORM WITH QUANTIFIER GIVEN TO SATISFIABILITY DETERMINATION UNIT

| | DETERMINATION ITEM | CONSTRAINT FORM GIVEN TO SATISFIABILITY DETERMINATION UNIT | DETERMINATION RESULT, OUTPUT INFORMATION, AND MEANING THEREOF |
|---|---|---|---|
| ① | SAFETY OF PLANNED OPERATION | $\exists \{X, USYS, Z\} \mid [F\_constraint(X, USYS, Z) = true]\}$ such that <br> $[F\_plan(X, USYS) = true]$ & & <br> $[F\_command(X, USYS) = true]$ & & <br> $[F\_safety(X, Z, USYS) = true]$ is SATisfiable. | IN THE CASE OF SAT <br> SAFETY OF PLANNED OPERATION IS VERIFIED. <br> SATISFYING SOLUTION USYS IS USED AS CONTROL INPUT VALUE ROW. <br> IN THE CASE OF UNSAT <br> THIS MEANS THAT PLANNED OPERATION CANNOT BE ACHIEVED. <br> NOTIFY UNJUSTNESS OF PLANNED OPERATION. |
| ② | CONFIRMATION OF SATISFACTION OF OPERATION-TIME PRECONDITION | $\exists UDYN$ such that <br> $[F\_assumption(X, Z, UDYN) = true]$ is SATisfiable. | IN THE CASE OF SAT <br> IT IS VERIFIED THAT TARGET SURROUNDING MOVING OBJECT IS NOT PERFORMING OPERATION VIOLATING NORMAL-TIME PRECONDITION. <br> IN THE CASE OF UNSAT <br> IT IS VERIFIED THAT TARGET SURROUNDING MOVING OBJECT IS PERFORMING OPERATION VIOLATING NORMAL-TIME PRECONDITION. |
| ③ | CONFIRMATION OF CONFORMITY BETWEEN NORMAL-TIME PRECONDITION AND WORST-TIME PRECONDITION | $\exists UDYN$ such that <br> $[F\_assumptionWorst(X, Z, UDYN) = true]$ & & <br> $[F\_assumption(X, Z, UDYN) = false]$ is UNSATisfiable. | IN THE CASE OF SAT <br> THERE MAY BE A CASE WHERE NORMAL-TIME PRECONDITION IS NOT SATISFIED EVEN THOUGH WORST-TIME PRECONDITION IS SATISFIED, AND NORMAL-TIME PRECONDITION IS NOT IN CONFORMITY WITH WORST-TIME PRECONDITION. <br> NOTIFY INCONFORMITY <br> IN THE CASE OF UNSAT <br> NORMAL-TIME PRECONDITION IS IN CONFORMITY WITH WORST-TIME PRECONDITION. |

FIG. 8(b)

EXAMPLE OF CONSTRAINT FORM WITH QUANTIFIER GIVEN TO SATISFIABILITY DETERMINATION UNIT

| | DETERMINATION ITEM | CONSTRAINT FORM GIVEN TO SATISFIABILITY DETERMINATION UNIT | DETERMINATION RESULT, OUTPUT INFORMATION, AND MEANING THEREOF |
|---|---|---|---|
| ④ | HAZARD OCCURRENCE POSSIBILITY | $\{\exists UDYN \mid [F\_assumption(X, Z, UDYN) = true]\}$ such that <br> $[F\_constraint(X, USYS, Z) = true]$ && <br> $[F\_plan(X, USYS) = true]$ && <br> $[F\_command(X, USYS) = true]$ && <br> $[F\_safety(X, Z, USYS) = false]$ is SATisfiable. | IN THE CASE OF SAT <br> OPERATION CONTROL COMMAND VALUE ROW UDYN OF SURROUNDING MOVING OBJECT VIOLATING SAFETY REQUIREMENT AND EXTERNAL STATE VALUE ROW Z, UDYN RESULTING IN VIOLATION STATE ARE NOTIFIED AS HAZARD FACTOR. <br><br> IN THE CASE OF UNSAT <br> AS LONG AS NORMAL-TIME PRECONDITION IS SATISFIED, SURROUNDING MOVING OBJECT CANNOT PERFORM OPERATION CAUSING HAZARD, AND PLANNED OPERATION IS SAFE. |
| ⑤ | HAZARD AVOIDING POSSIBILITY | $\{\forall UDYN \mid [F\_assumptionWorst(X, Z, UDYN) = true]\},$ <br> $\{\exists X, USYS \mid [F\_constraint(X, USYS, Z) = true]\}$ such that <br> $[F\_plan(X, USYS) = true]$ && <br> $[F\_command(X, USYS) = true]$ && <br> $[F\_safety(X, Z, USYS) = true]$ is SATisfiable. | IN THE CASE OF SAT <br> IT IS VERIFIED THAT, EVEN IF ANY GIVEN OPERATION IS PERFORMED WITHIN RANGE SATISFYING WORST-TIME PRECONDITION OF SURROUNDING MOVING OBJECT, HAZARD CORRESPONDING TO SAFETY REQUIREMENT VIOLATION IS NOT BROUGHT ABOUT AS LONG AS CALCULATED ALTERNATIVE PLANNED TRACK IS USED. HAZARD FACTOR AVOIDING OPERATION IS ACHIEVED BY USING SATISFYING SOLUTION USYS AS CONTROL INPUT VALUE ROW. <br><br> IN THE CASE OF UNSAT <br> SURROUNDING MOVING OBJECT CAN PERFORM INCONVENIENT OPERATION VIOLATING SAFETY REQUIREMENT. NOTIFY EXTERNAL STATE VALUE ROW Z OF TIME-SERIES RESULTING IN HAZARD. |

FIG. 10

LIST OF INFORMATION STORED IN RECORDING DEVICE

| | STORED INFORMATION | VALIDITY OF REGISTERED DATA | REGISTRATION TIME POINT | DATA VALID PERIOD | DATA |
|---|---|---|---|---|---|
| 1 | UNJUSTNESS OF OPERATION-TIME CONSTRAINT | VALID/INVALID | T1 | T1+5 SECONDS | D1 |
| 2 | UNJUSTNESS OF NORMAL-TIME PRECONDITION OF SURROUNDING MOVING OBJECT | VALID/INVALID | T2 | T2+5 SECONDS | D2 |
| 3 | INCONFORMITY OF NORMAL-TIME PRECONDITION AND WORST-TIME PRECONDITION | VALID/INVALID | T3 | T3+5 SECONDS | D3 |
| 4 | UNJUSTNESS OF PLANNED OPERATION | VALID/INVALID | T4 | T4+5 SECONDS | D4 |
| 5 | UNJUSTNESS OF SAFETY REQUIREMENT | VALID/INVALID | T5 | T5+5 SECONDS | D5 |
| 6 | UNJUSTNESS OF EXPECTED OPERATION | VALID/INVALID | T6 | T6+5 SECONDS | D6 |
| 7 | ABNORMALITY OF PLANNED OPERATION | VALID/INVALID | T7 | T7+5 SECONDS | D7 |
| 8 | INFORMATION ABOUT SURROUNDING MOVING OBJECT PERFORMING BEHAVIOR VIOLATING NORMAL-TIME PRECONDITION | VALID/INVALID | T8 | T8+5 SECONDS | D8 |
| 9 | SURROUNDING MOVING OBJECT THAT MAY CAUSE HAZARD | VALID/INVALID | T9 | T9+5 SECONDS | D9 |
| 10 | EXTERNAL STATE VALUE ROW Z OF TIME SERIES RESULTING IN HAZARD | VALID/INVALID | T10 | T10+5 SECONDS | D10 |
| 11 | SURROUNDING MOVING OBJECT CAUSING UNAVOIDABLE HAZARD | VALID/INVALID | T11 | T11+5 SECONDS | D11 |
| 12 | EXTERNAL STATE VALUE ROW Z OF TIME SERIES RESULTING IN UNAVOIDABLE HAZARD | VALID/INVALID | T12 | T12+5 SECONDS | D12 |
| 13 | SPECIFIC STATE VALUE ROW X AND ALTERNATIVE PLANNED OPERATION FOR AVOIDING HAZARD | VALID/INVALID | T13 | T13+5 SECONDS | D13 |
| 14 | OPERATION CONTROL COMMAND VALUE ROW FOR AVOIDING HAZARD | VALID/INVALID | T14 | T14+5 SECONDS | D14 |
| 15 | TIME-SERIES VALUE OF INTERNAL STATE VALUE OBTAINED BY INTERNAL STATE MEASUREMENT MEANS | VALID/INVALID | T15 | T15+5 SECONDS | D15 |
| 16 | TIME-SERIES VALUE OF EXTERNAL STATE VALUE OBTAINED BY EXTERNAL STATE MEASUREMENT MEANS | VALID/INVALID | T16 | T16+5 SECONDS | D16 |
| 17 | TIME-SERIES VALUE OF PLANNED OPERATION AND EXPECTED OPERATION, SAFETY REQUIREMENT, AND SETTING INFORMATION ABOUT OPERATION-TIME PRECONDITION | VALID/INVALID | T17 | T17+5 SECONDS | D17 |

CLARIFY THAT THE REASON WHY VALID PERIOD IS REQUIRED. DATA OF EXTERNAL STATE VALUE BECOMES OBSOLETE.

CONFIGURATION OF DISPLAY SCREEN OF PRESENTING DEVICE

AUTONOMOUS OPERATION VERIFICATION DEVICE AND AUTONOMOUS SYSTEM

TECHNICAL FIELD

The present invention relates to an autonomous operation verification device for monitoring operation safety of an autonomous system operating in an open environment, and an autonomous system provided with the autonomous operation verification device.

BACKGROUND ART

Conventionally, research has been conducted on a system having an autonomous function has the means for measuring the situation of the operation environment, and determines and adjusts autonomous operation according to a built-in program without requiring intervention of the operator. However, in spite of long-term technical development, such system has been introduced only in a limited operation environment, and this situation has not changed until today.

The system has not been introduced because of the following reason. Although all the processing steps of external recognition, situation determination, and system control are implemented with control software, existing designs and procedures for inspection and certification are not made to detect failures before the introduction of the system on the basis of the operation of the system in an open operation environment.

The fundamental reason for this is that an implicit assumption that the situation at the time of failure, which should be necessary to quantitatively show the reliability of the system, can be reliably or probabilistically reproduced reliably does not hold in an open environment. Therefore, it is not possible to uniquely identify the cause or it is difficult to show the effectiveness of measures even though investigation of causes and countermeasures are required from the time when an issue occurs in which it is suspected that the function actually implemented by control software does not perform an unintended operation. This is the reason why countermeasures are required that are fundamentally different from the current recall factor such as accidental faults and deterioration due to aging of machine parts.

For example, PTL 1 discloses a method in which a vehicle system equipped with an automatic driving function determines the presence or absence of hazard due to a contact with other vehicles around the vehicle in question. This Literature discloses a method for determining the safety nature of the course of the vehicle in question by using a predicted course of another vehicle. However, the course of another vehicle is expected to be determined based on the driver's free will while satisfying constraint of traffic regulations, and it is difficult to guarantee the validity and the safety of the predicted course and the design of software that implements its calculation method, and there is still a possibility that a hazard would occur without satisfying the safety requirement because of a behavior of deviation from the predicted course.

From a technical point of view, if there is no factor that leads to hazard, the means to prove it is missing, and if there is a factor that leads to hazard, there is no way to reproduce the concrete situation. Existing test methods that lack comprehensiveness are not useful as any of these means. Therefore, the existing test methods are inadequate as a verification evidence used in asserting the reliability of the system.

CITATION LIST

Patent Literature

PTL 1: JP 2012-226699 A Toyota Motor Corporation

SUMMARY OF INVENTION

Technical Problem

The fundamental reason why the system of complete software control such as an automatic driving system results in unexpected operation including hazard is that the system goes into a situation in which the system is unable to achieve both of the operation expected for the vehicle and the operation safety imposed on the vehicle, so that both are unsatisfiable. When such fundamental reason is considered, a mechanism to realize the operation safety of such an autonomous system that operates in an open environment is necessary. However, it is difficult to comprehensively cover the situations which may result in unsatisfactory during designing, and it is necessary to make determinations during operation.

The first reason is that it is difficult to consider, in the design stage, a situation in which the expected operation itself of the vehicle in question may impair the satisfiability of the operation safety and individually classify the countermeasures to comprehensively cover the countermeasures. Until today, in a case where the expected operation becomes unsatisfiable due to the intrinsic factors such as failure of a system constituent element and constraint of operation flexibility of the system and in a case where operation safety is impaired by the extrinsic factors of the vehicle such as contact avoidance function with other vehicles around the vehicle in question, they are dealt with as different design problems. However, if there are cases that could not be covered during the designing, these cases cannot be known predictively, and only after the hazard really occurs, the case is exposed as an unexpected hazard factor. Therefore, it is desirable to establish a mechanism to determine whether a situation in which both of the expected operation and the operation safety cannot be achieved at a time may occur or not.

The second reason is that the operation safety mainly depends on the behavior determined based on the free will of the moving body that exists in the operation environment, and the system in question cannot control the behavior, and it is impossible in principle to perform prediction with a high degree of reliably. Therefore, it is necessary to make settings based on the information about the operation environment observed during the operation.

However, although it is impossible to control and predict the behavior, it is possible to limit the set of behaviors that can be realized in the near future. This is because the limit of physical operation flexibility and the standard of operation flexibility in a normal state can be found in the moving object such as, for example, automobiles and pedestrians. Therefore, it is necessary to set the operation safety by using data obtained by measuring the situation of the operation environment in view of the constraint conditions caused by the operation flexibility. The role that this mechanism plays has essentially a predictive nature. This is because the time of occurrence of the hazard is a time point in the near future and it is identified only after it is determined that the hazard may occur during the operation, and there is still a time to a situation in which the hazard is actually inevitable, and further, there is still room left to make a transition so that the hazard factor would not result in the hazard, and there is still room left to perform countermeasures so that the system in question avoids the hazard factor.

In addition, processing contents processed by software cannot be observed from the outside, and similarly, processing related to hazard determination and the control of the autonomous system cannot be observed from the outside. These two points make inspection and certification from the third-party position difficult. Therefore, in order to be able to effectively use this predictive property during operation, the above mechanism is desired to be realized while means is provided to allow the operator of the system and the person in charge of verification in the third-party position observe the information from the outside during operation.

Solution to Problem

An operation-time constraint limiting a range of an internal state is set by using the internal state of the system in question obtained by internal state measurement means, and an operation-time precondition limiting a range of the external state is set by using the external state obtained using the external measurement means, and a safety requirement constraining a relationship between the internal state and the external state is set, and all of the safety requirement and the expected operation of the system in question that has been set and the planned operation calculated for the purpose of achieving the expected operation are converted into a constraint form with a quantifier, and a satisfiability determination problem is solved during operation, so that a determination is made as to whether both of the expected operation and the safety requirement cannot be achieved to result in an unsatisfiable or not. The determination content is classified into three.

Firstly, a determination is made as to whether there is any satisfying solution achieving the planned operation while satisfying the safety requirement, when a satisfying solution exists, it is notified that the operation safety is verified, and if a satisfying solution does not exist, it is notified that the planned operation cannot be achieved or results in hazard, and it is asked to correct the planned operation.

Secondly, a determination is made as to whether there is any satisfying solution of a time series sequence transition value of the external state resulting in hazard violating the safety requirement under the operation-time precondition, and when a satisfying solution exists, a message indicating that the obtained hazard may be caused and a value of time series sequence transition of a specific state are notified, and when a satisfying solution does not exist, it is notified that operation safety is guaranteed even when the system in question is operated based on the planned operation.

Thirdly, a determination is made as to whether there is any alternative planned operation satisfying the safety requirement regardless of the external state that could be taken under the operation-time precondition, and when an alternative planned operation exists, a message indicating that the safety requirement is satisfied and the alternative planned operation are notified, and when an alternative planned operation does not exist, it is notified that there is a hazard factor that could not be avoided. As necessary, it is overwritten with the alternative planned operation and the operation safety is recovered.

The data used for determine the above satisfiability, i.e., all the notification information generated during the operation and the measurement information before and after that, are saved in the recording device, and as the set of data having the same time is reproduced sequentially, the operator of the autonomous system can reproduce the situation before and after the occurrence of abnormality, so that the operator of the autonomous system can track the cause of the abnormality.

Similarly, the processing result related to the determination and the control is output to the presenting device during operation, so that the operator of the autonomous system will be able to deal with the detected hazard factor during operation in a foreseeable manner.

Advantageous Effects of Invention

A mechanism for realizing operation safety of an autonomous system operating in an open environment is provided. In particular, presence or absence of hazard factor is comprehensively searched during operation, and when there is no hazard factor, the operation safety can be guaranteed, and when there is a hazard factor, operation of the system in question is corrected, so that the operation safety can be recovered by taking countermeasure so as to solve the hazard factor.

If the hazard really occurs, the situation is reproduced in such a manner that a third party can perform verification, so that the fundamental reason can be tracked.

Further, the recovery process of the determination and the operation safety of the hazard factor can be observed during operation of the system, and even during the operation, the operator of the system can take a predictive countermeasure based on the predictive information about the possibility of hazard occurrence.

In addition, the observability is improved, so that the surrounding moving object observes the operation intention of the system in question, and while referring to the alternative planned operation of the system in question calculated, and the surrounding moving object determined to result in hazard can be prompted to avoid hazard.

BRIEF DESCRIPTION OF DRAWINGS

FIG. 2 illustrates functions of a satisfiability determination unit and input and output information.

FIG. 4 illustrates list of input information to an autonomous operation verification device.

FIG. 5 illustrates constraint form with quantifier output by constraint form conversion unit.

FIG. 6 illustrates situation requiring avoidance and hazard factor.

FIG. 7 illustrates example of constraint form with quantifier generated by constraint form conversion unit.

FIG. 8(a) illustrates example of constraint form with quantifier given to satisfiability determination unit.

FIG. 8(b) illustrates example of constraint form with quantifier given to satisfiability determination unit.

FIG. 10 illustrates list of storage information into recording device.

DESCRIPTION OF EMBODIMENTS

First Embodiment

The first embodiment of the autonomous operation verification device using the present invention will be described below.

Figure 1:
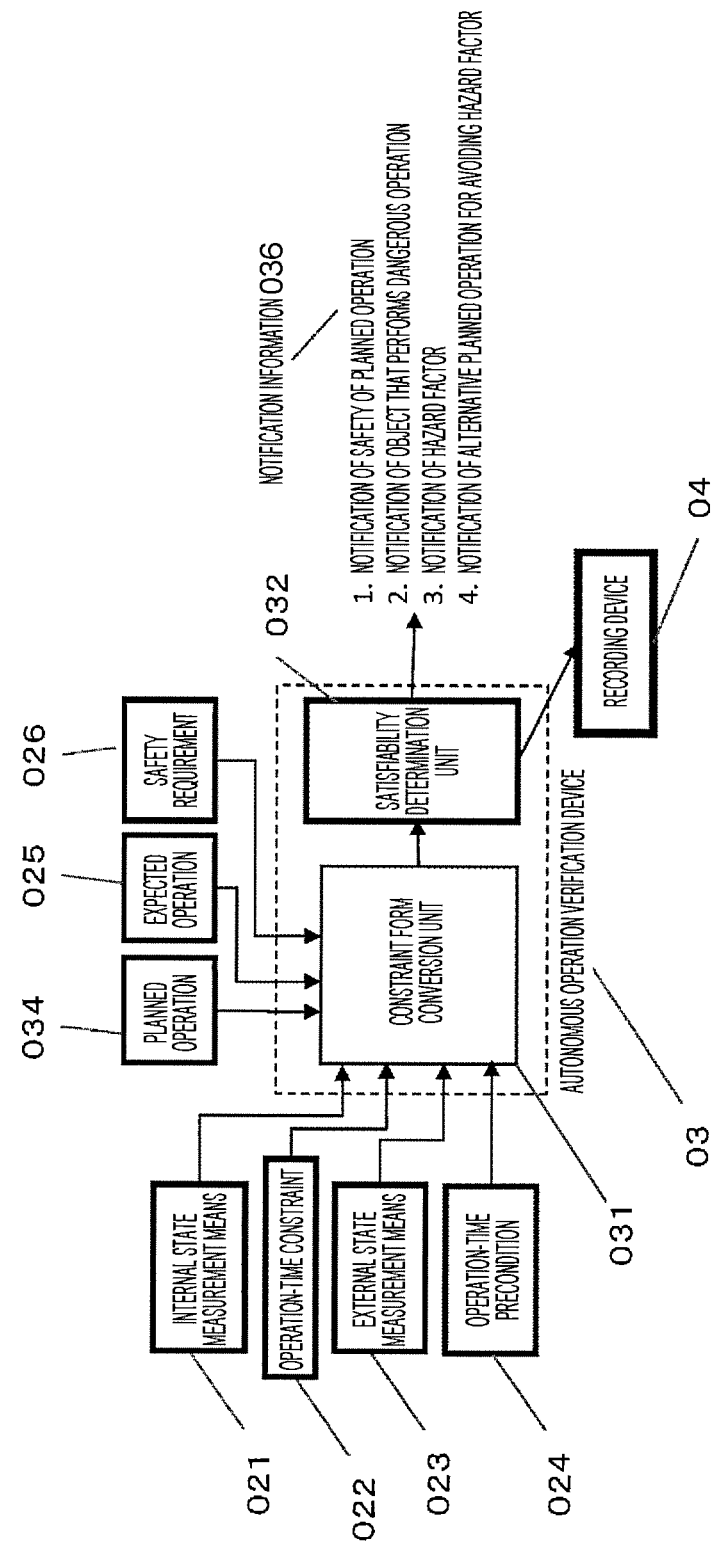
FIG. 1 illustrates an autonomous operation verification device.

FIG. 1 illustrates a configuration of an autonomous operation verification device 03. The internal state measurement means 021 successively updates the internal state (e.g., acceleration, speed, coordinate position, attitude angle, attitude angular velocity, and the like) of the system in question having the autonomous operation verification device 03.

The operation-time constraint 022 gives the range that the internal state can take due to the design constraint and the like of the system in question, for example, a control input value and upper and lower limit constraints of the time derivative thereof.

The external state measurement means 023 acquires the state quantity characterizing the operation environment of the system in question. For example, dynamic elements can be considered, in particular, the coordinate position, velocity, acceleration, posture angle, and the like of a moving object in the surroundings can be considered, and further, if the system in question is on the ground, the shape of the terrain and surrounding installations are included.

The operation-time precondition 024 limits state transitions that can occur in the near future in the external state, and a condition (normal precondition) that limits conventionally established state transition to facilitate prediction of short-term behavior for all dynamic elements and a condition to be established with physical limit or other high likelihood (worst-time precondition) are found.

The expected operation 025 commands the operation to be executed by the system in question and the safety requirement 026 is a constraint commanding the requirement to be satisfied in the execution process. The planned operation 034 is calculated using means different from the autonomous operation verification device 03, and is expected to be designed to satisfy any one of or all of the operation-time constraint 022, the operation-time precondition 024, the expected operation 025, and the safety requirement 026.

The constraint form conversion unit 031 receives the above input information and converts the input information into a form that can be mechanically processed by the satisfiability determination unit 032. In the present embodiment, the operation planning of the system in question is discussed as a subject, but in general it is known that a constraint form with quantifier can be constructed and the satisfiability can be determined.

A method (quantifier elimination) is known in which quantifiers are eliminated as necessary and mechanically rewritten to satisfiability determination problem without quantifier. Since the determination can be made in a shorter time if this conversion is performed, the satisfiability determination unit uses the one that includes such processing in the inside.

In the present embodiment, examples of information 036 that provides result notification of satisfiability determination include four items.

The first item of the information 036 is a notification of safety of planned operation, the second item is a notification of a target that performs dangerous operation in the sense of deviating from the operation-time precondition 024, the third item is a notification as to whether a hazard factors occurs or not, and the fourth item is a notification as to whether there is any hazard factor avoidance operation or not.

The satisfiability determination unit 032 is connected to a recording device 04 that stores the notification information 036 and data used in the determination process.

FIG. 2 is a summary of input and output information and the functions of the satisfiability determination unit.

The input information is a constraint form with a quantifier, and is constituted by variable lists V1 to Vn, a binary function F giving true or false in response to specific values of these variables, and quantifiers (quantifiers) that are set for these variables. The quantifier is anyone of FORALL (universal quantifier) and EXISTS (existential quantifier), and the quantifier expresses a case where any given value is taken within the range described in a part of the binary function, or a case where one or more satisfying solutions exist within the range.

On the basis of the input information, a determination is made as to whether there is any satisfying solution (SATisfiable), or there is not any satisfying solution (UNSATisfiable), and when there is a satisfying solution, a concrete allocation value for the variable is calculated, and interpreted into an appropriate output format, and then notified as output information. The case of "unsatisfiable" corresponds to a case where there is a list of constraint forms which are a subset of a list of input constraint forms and which compete with each other and cannot satisfy all. They are referred to as UNSATISFIABLE CORE, and a method of calculating in the process of satisfiability determination is known.

It is known that the constraint form including the quantifier can be mechanically rewritten into a constraint form not including any quantifier by using the method called quantifier elimination when the arguments of the quantifier are discrete values. Even when the arguments of the quantifier are continuous values, there is also known a method of mechanically adding auxiliary variable and converting the auxiliary variable into a form that can process solver of linear planning method or nonlinear planning method.

Generally, a method of erasing the quantifier FORALL is reductio ad absurdum, and it is mechanically rewritten into a form using quantifier EXISTS, resulting in a problem of determining satisfiability. For example, the condition that the variable being the argument has a satisfying solution for any given value within a predetermined range can be solved by determining absence and presence of the satisfying solution by performing logical inversion into a constraint form indicating that the allocation value that eliminates the satisfying solution within a predetermined range is none (UNSATisfiable). Therefore, the satisfiability determination unit used in the present embodiment may use the one that has, in the inside, the function of, instead of directly determining the satisfiability of the input information, searching the satisfying solution by making rewriting into a form not including any quantifier in advance.

Further, the binary function F may be the one that is made by connecting a plurality of other binary functions and a logical sum or a logical product. It is known that a general binary function made with any given combination of the logical sum and the logical product is reduced into a CNF (Conjunctive Normal Form) form, i.e., a form of logical sum of constraint forms connected with the logical product, by way of mechanical conversion.

In general, as long as conversion into CNF form is made, many mathematical methods to quickly determine satisfiability can be applied. For example, this is coped with a calculator implementation and the like of evaluating the satisfiability for each binary function group constituting each partial constraint form divided by the logical sum and connected with the logical product, or a method in which the solver itself used for the satisfiability determination collectively evaluates the constraint form connected with the logical sum has been developed, and in the case of the discrete value, a method using SMT solver (Satisfiability Modulo Theory) can be used, and in the case of the continuous value, a method using MINLP solver (Mixed Integer Nonlinear Programming) can be used.

Figure 3:
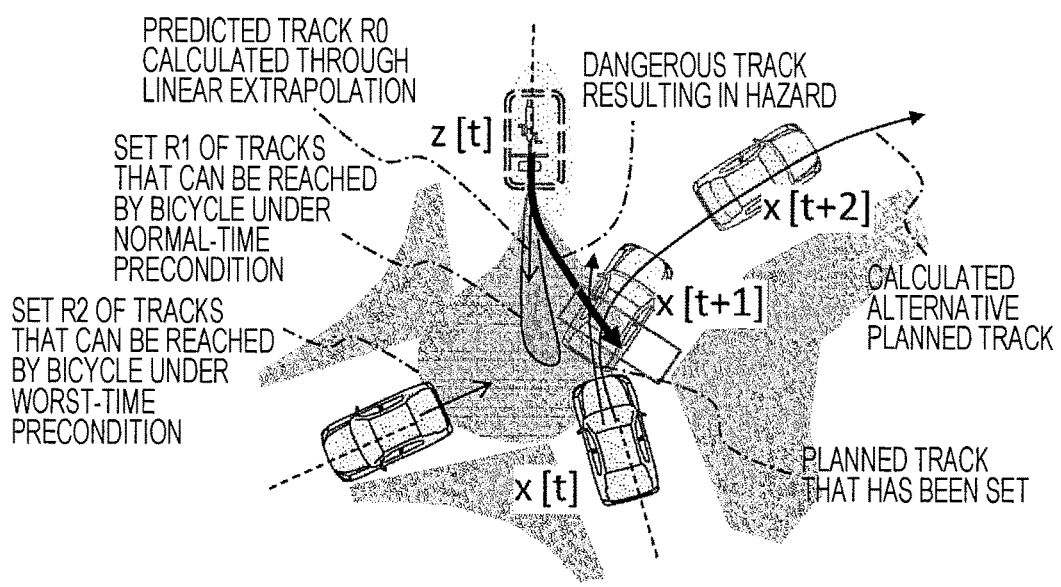
FIG. 3 illustrates definition of various kinds of variable values.

FIG. 3 shows a situation drawing of an autonomous system in an open operation environment in which a plurality of surrounding moving objects move. In this situation drawing, the system in question is considered to approach head-on an oncoming bicycle that moves to pass the system in question.

In this example, two safety requirements are used, which include a safety requirement of "not coming into contact" and a weak safety requirement of "not coming into contact with any of the surrounding moving objects at a positive relative speed". The weak safety requirement means allowing surrounding moving objects to come into contact with the system in question.

It should be noted that in an operation environment which is crowded with numerous surrounding moving objects and where the system in question is forced to move in the plane, there is always a case where strong safety requirement falls into unsatisfiable state, but the weak safety requirement is a safety requirement that is always likely to be established as long as the system in question moves properly. The weak safety requirement is consistently used throughout the present embodiment.

An operation flexibility which is conventionally satisfied in an operation environment and an operation flexibility derived from physical limit are found in a surrounding moving object. Constraint forms corresponding to the above two operation flexibilities will be referred to as a normal-time precondition a worst-time precondition.

In FIG. 3, for convenience of illustration, a track calculated according to a method such as, e.g., linearly extrapolating the past movement track is defined as R0, a set of tracks that can cause a hazard in such a manner to violate a predetermined safety requirement within a predetermined time serving as a verification period under any given operation flexibility that can be realized within the range satisfying the normal-time precondition is defined as R1, and a set of tracks that can cause a hazard in such a manner to violate a predetermined safety requirement within a predetermined time under any given operation flexibility that can be realized within the range satisfying the worst-time precondition is defined as R2.

This set of tracks is a set of tracks that violates the predetermined safety requirement, unlike the area where the surrounding moving object can reach within the predetermined time under specified precondition, and the set of tracks is amorphous in the sense that it deforms from time to time in accordance with the state of the system in question and the situation of the operation flexibility and the operation environment of the surrounding moving object. Therefore, although it is difficult to compute the general form, at least an inclusion relation is established in which a partial set of R2 is R1 and a concrete track that is a part of R1 is R0. The track actually taken by the surrounding moving object is determined by the free will of the surrounding moving object, and there is also the possibility that the track actually taken by the surrounding moving object may deviate from the predicted track, and may deviate from the set of tracks R1. However, the track actually taken by the surrounding moving object is guaranteed not to deviate from the set of tracks R2.

In a situation where the safety requirement cannot be violated even if the surrounding moving object takes any behavior within the range that satisfies the operation flexibility equivalent to the worst-time precondition as long as the above guarantee is established, the bicycle cannot cause a hazard and is thus guaranteed to be essentially safe. For example, when there is a sufficient distance between the automobile approaching from the left and the planned track of the system in question and the guarantee mentioned above is established, the planned track of the system in question is essentially safe.

On the other hand, in this method, the correctness of the decision result using predicted track R0 or the set of tracks R1 is not guaranteed. Actually, the system in question shown in FIG. 3 cannot cross the predicted track R0 and the set of tracks R1, and so long as the normal-time precondition is established, the planned track in which the system in question passes the oncoming approaching bicycle safely is drawn. However, regardless of the normal-time precondition, the bicycle has decided the future track based on the free will and the system in question cannot find the intention of the movement of the bicycle. Therefore, in a case where operation is performed in the range which is the operation flexibility of the bicycle and which is a range that does not satisfy the normal-time precondition but satisfies the worst-time precondition, i.e., an operation which belongs to the set of tracks R2&!R1 is performed, it is in a situation that can cause a hazard operation.

Therefore, as soon as the operation that actually causes hazard becomes feasible under the normal-time precondition, it is necessary for the system in question to determine whether there is an alternative planned track that does not violate weak safety requirement under the worst-time precondition. The system in question can recover the essentially safe situation in the sense that as long as this alternative planned track exists, the system in question can proceed along the planned track, or the system in question cannot perform an operation causing the hazard by switching to the calculated alternative planned track.

In this situation, the present invention is applied to the problem of verifying the imposed safety requirement.

As shown in FIG. 8 explained later, the autonomous operation verification device 03 confirms the safety of the planned operation, confirms the establishment of the operation-time precondition, determines the possibility of occurrence of the hazard under the normal-time precondition, and determines the hazard avoidance possibility in the worst-time precondition, thus notifying a determination result.

FIG. 4 illustrates a list of variables used for this problem. In particular, the internal state value of the system in question obtained by way of the internal state measurement means 021, the operation control instruction value controlling the dynamic state of the system in question, the external state value obtained by way of the external state measurement means 023 which is targeting the operation environment including the surrounding moving object, and the operation control instruction value of the surrounding moving object which is a virtual variable value introduced in order to make into a model the operation flexibility that could be made by the surrounding moving object are used.

FIG. 5 and FIG. 6 show a list of various kinds of input information given to the constraint form conversion unit 031. FIG. 7 shows a constraint form with quantifier that is output by the constraint form conversion unit 031 based on the input information. It should be noted that the quantifier and various kinds of binary function are defined for each problem, and the output form of FIG. 7 is only an example that is set according to this situation drawing.

The individual constraint form shown in FIG. 6 will be briefly explained.

The operation-time constraint of the system in question is derived from specification definition range in which the system can realize behaviors as designed, such as operation control instruction values for mainly controlling dynamic behavior. The operation-time constraint of the system in question includes, for example, constraints related to upper and lower limit ranges, upper and lower limit ranges of time difference of the operation control instruction value, and transition of the internal state value caused by dynamic characteristics of the system.

The normal-time precondition of the surrounding moving object is the same type as the operation-time constraint of the system in question, but is a constraint condition narrower than the specification definition range, and is to designate the operation flexibility of the surrounding moving objects, usually satisfied during normal operation.

On the other hand, the worst-time precondition corresponds to the operation-time constraint of the system in question, and is to designate the limit of the operation flexibility that can be realized in terms of the mechanism.

These two preconditions play different roles in determining the risks associated with hazard occurrence. More specifically, the risk of hazard occurrence is evaluated in predictive manner by determining whether surrounding moving object can cause hazard with the normal-time precondition, and a countermeasure is taken by recovering the essentially safe situation by using alternative planned track under the worst-time precondition.

For example, the planned operation uses point sequence information that is deemed as a tack when only the spatial coordinate component in the internal state value sequence of the system in question is designated. A constraint condition is used such that the deviation from track is less than the predetermined upper limit.

The constraint form corresponding to the expected operation corresponds to the condition to be satisfied after the planned operation is executed. Conventionally, the system in question is often a moving object, and the expected operation is often an arrival at the target area, and therefore, for the sake of convenience, only the internal state value of the system in question is used as an argument. When the expected operation itself is a type of a thing for operating by adapting to the outside, both of the external state value and the internal state value may be described together.

The constraint form corresponding to the safety requirement is a combination of the internal state value and the external state value. In the case of the above-mentioned strong safety requirement, a constraint condition expression determined by only the relative relationship of space coordinates may be used.

Figure 9:
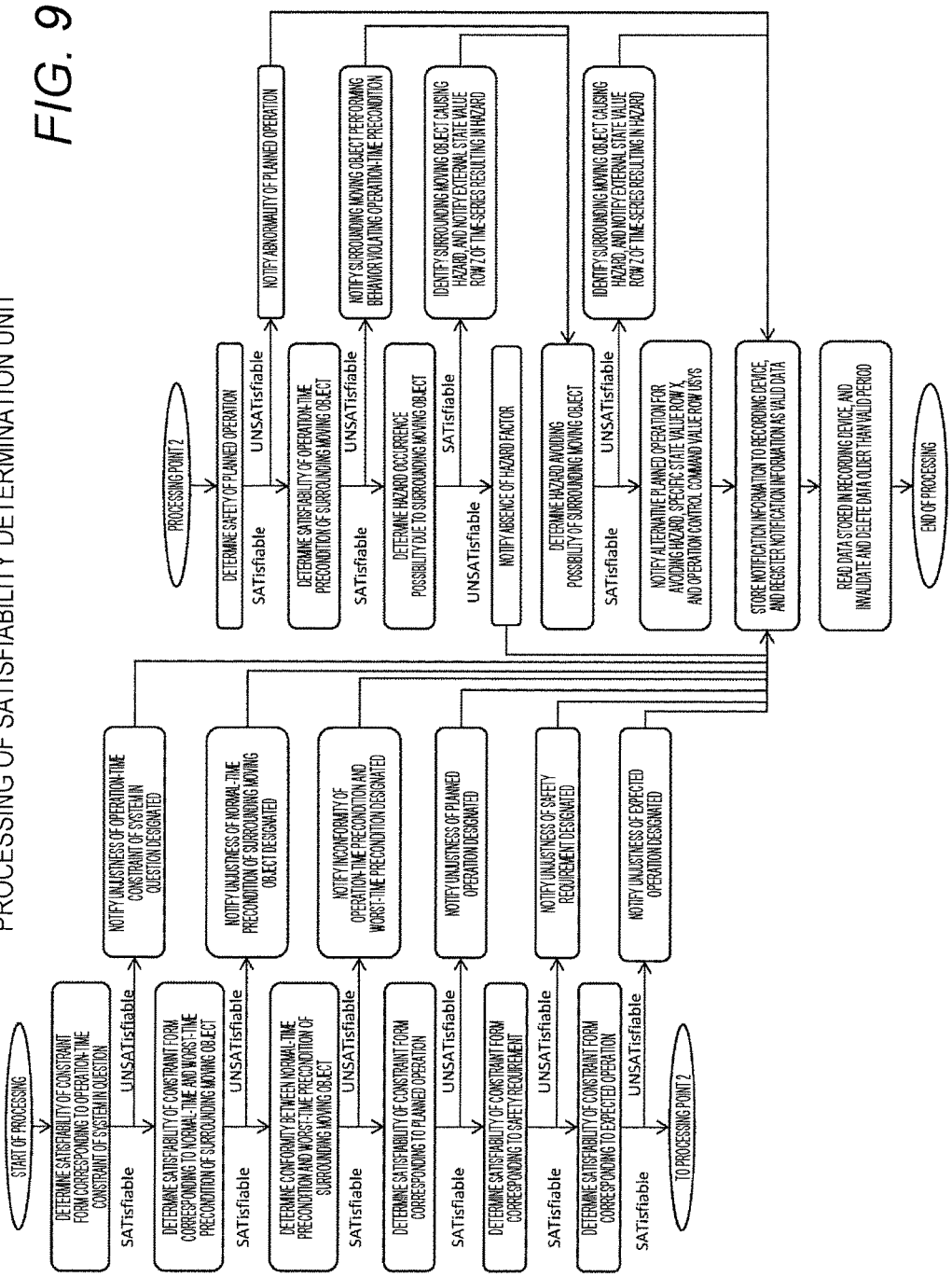
FIG. 9 illustrates processing of satisfiability determination unit.

FIG. 7 is a mode of a constraint form with a quantifier that is output by the constraint form conversion unit. A specific example of a constraint form with a quantifier is shown for each determination item. A series of processing flows obtained by connecting the above determination problems are shown in FIG. 9.

It is necessary to verify the validity of various kinds of constraint forms which are input information before starting the evaluation of each decision item. This is firstly a countermeasure for the situation in which a module other than the autonomous operation verification device has a failure, and as a result of propagation of the effect, unjust data is provided to the autonomous operation verification device to make a false determination.

A determination is made as to whether each of the operation-time constraint, the normal-time and worst-time preconditions and the consistency thereof, the planned operation, the safety requirement, and the expected operation as the input information have satisfying solutions as the constraint forms of their own.

When there is no satisfying solution, it is notified that the input information is unjust. After these pre-processing, various kind of determination processing subsequent thereto are started.

The safety of the planned operation may be obtained by solving the satisfiability determination problem of the constraint form with the quantifier for determining the presence or absence of an operation control instruction value sequence that satisfies the planned operation, the expected operation, and the safety requirement designated under the operation-time constraint of the system in question.

When a satisfying solution exists, the safety of the planned operation is verified and an operation control instruction value sequence which is actually a satisfying solution can be used. Conversely, when it is determined that there is no satisfying solution, either the planned operation itself cannot be realized under the operation-time constraint or violates the safety requirement, or the expected operation cannot be realized. In the list of the constraint forms given to the satisfiability determination unit, an incompatible constraint form equivalent to UNSAT Core exists and is analyzed, so that the cause of impairing the safety of the planned operation can be uniquely identified.

In order to confirm establishment of the operation-time precondition, the spatial coordinates value sequence of the surrounding moving object to be evaluated, i.e., the external state value sequence such as a track is retrieved, and under the predetermined normal operation-time precondition, the satisfiability determination problem of the constraint form with the quantifier that determines the presence or absence of operation control instruction value sequence that realizes the external state value sequence may be solved.

It is verified that when there is a satisfying solution, the surrounding moving object to be evaluated is operating under the operation flexibility equivalent to the normal-time operation precondition.

When a satisfying solution does not exist, the surrounding moving object to be evaluated deviates from operation flexibility corresponding to the normal-time operation precondition, and the operation is performed under operation flexibility equivalent to the worst-time precondition. It is desirable to start processing to determine the possibility of hazard avoidance as soon as this decision result is obtained.

When subsequently confirming the consistency between normal-time precondition and worst-time precondition, it is similarly reduced to the satisfiability determination problem of constraint form with quantifier. This is used to detect cases where both constraint conditions are specified as an unjustness condition that is not inclusive like the set of tracks R1 and R2 shown in FIG. 3. It can be determined whether or not there is no operation control instruction value sequence of a surrounding moving object that satisfies the worst-time precondition but does not satisfy the normal-time precondition (UNSATisfiable).

When a satisfying solution does not exist, both preconditions are verified to be consistent. On the other hand, when a satisfying solution exists, the operation instruction value sequence that becomes a specific allocation value is a solution that causes a desired inconsistency.

In order to solve a problem of determining hazard occurrence possibility, a problem of determining whether there is a satisfying solution that satisfies, in the operation control instruction value sequence of the selected surrounding moving object that could be freely taken under the normal-time precondition, the operation constraint of the system in question and constraint conditions related to the planned operation of the system in question and the expected operation of the system in question but does not satisfy the predetermined safety requirement preferably the strong safety requirement may be solved.

When there is a satisfying solution, this means that the surrounding moving object can perform the operation that causes hazard in the sense that it does not satisfy the safety requirement. At this occasion, by retrieving the operation control instruction value sequence of the surrounding moving object from the specific assignment value and restoring the external state value sequence calculated by actually setting it, transition process of a specific time series resulting in the hazard is obtained.

When a satisfying solution does not exist, the surrounding moving object cannot perform operation to cause hazard as long as normal-time precondition holds, and the planned operation is verified as safe.

In order to determine hazard avoidance possibility, a problem of determining whether there is an operation control instruction value sequence that satisfies the weak safety requirement of the expected operation of the system in question and the operation-time constraint of the system in question even with the operation control instruction value of the selected surrounding moving object that could be taken with the worst-time precondition may be solved.

When there is a satisfying solution, it is verified that not inviting hazard equivalent to safety requirement violation when the alternative planned track is used even though the surrounding moving object performs any operation within the range where the worst-time precondition is satisfied. The operation control command value sequence of the system in question may be retrieved from the satisfying solution and it may be used as a control input value sequence to realize the alternative planned operation.

When a satisfying solution does not exist, this means that there is a surrounding moving object that can perform an inconvenient operation violating the safety requirement and can cause a hazard. In this case, the external state value sequence of the time sequence resulting in hazard is notified.

The data and notification information used in the decision process are stored in the recording device 04 upon made into the format of FIG. 10, and the registration time and registration deadline are registered as valid data.

In this case, all the determination results are based on the measurement value of the external state and the internal state which change in the temporal sequence, and the data is updated in the process in which the system in question operates, and therefore, it should be noted that it is necessary to set a valid period for each storage data. Therefore, of the data stored in the recording device, all the data exceeding the valid period is invalidated and the registration information is deleted, and then the series of processing is terminated.

Second Embodiment

Figure 11:
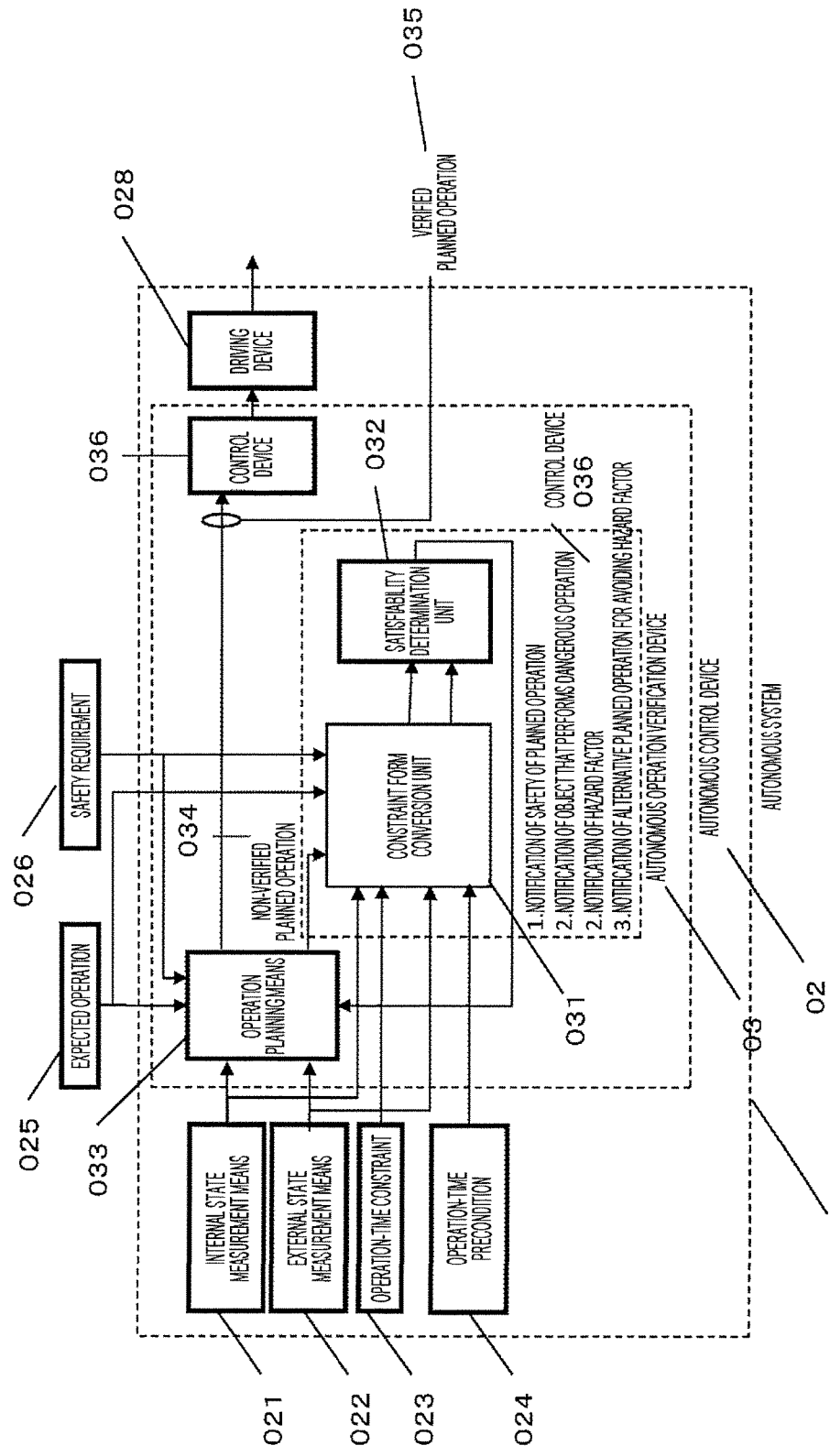
FIG. 11 illustrates autonomous system having autonomous operation verification device.

FIG. 11 shows a configuration example of an autonomous control device and an autonomous system equipped with the autonomous operation verification device disclosed in FIG. 1. A typical configuration of the autonomous system is constituted by hardware including internal state measurement means 021, external state measurement means 022, an autonomous control device 03, and a driving device 028.

An autonomous control device 02 inputs an expected operation 025 and a safety requirement 026, and an operation planning means 033 calculates a pre-verification planned operation 034. The autonomous system not having the autonomous operation verification device regards the pre-verification planned operation as verified planned operation 035 based on the implicit assumption that the pre-verification planned operation is correct, and outputs the pre-verification planned operation as it is to the control device 036.

On the other hand, the autonomous control device 02 having the autonomous operation verification device 03 play a role of safety mechanism for avoiding hazard that is caused when the pre-verification planned operation 034 is unjust and is output to the control device 036 as it is. In a typical configuration, example, the pre-verification planned operation 034 is received, and various kinds of determination items are evaluated, and the notification information 036 is returned to the operation planning means.

The operation planning means 033 re-computes the pre-verification planned operation 034 again when there is a hazard factor based on the notification information, or overwrites it with the alternative planned operation for avoiding the hazard factor, and adopts it as the verified planned operation 035.

Third Embodiment

Figure 12:
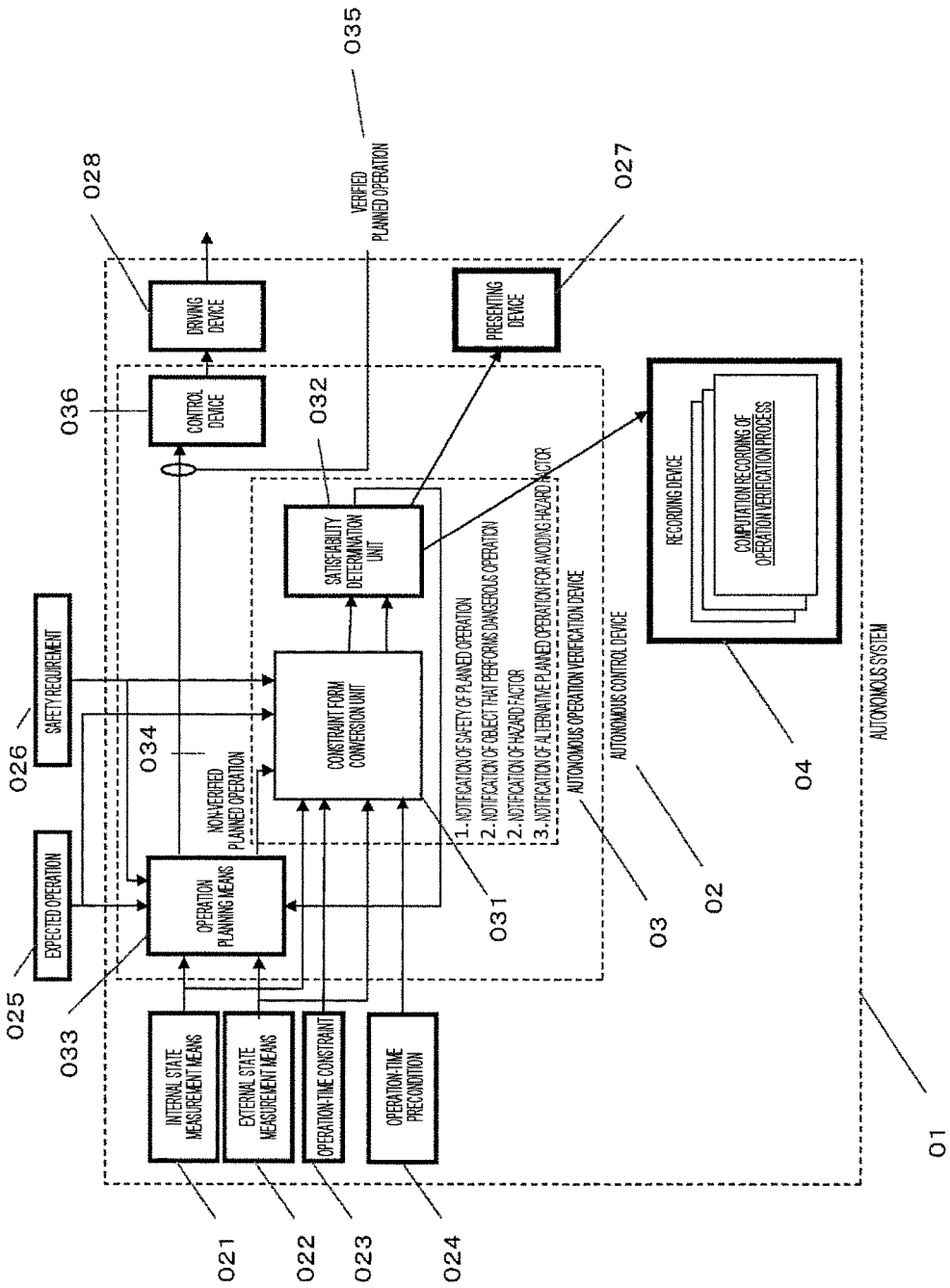
FIG. 12 illustrates autonomous system including presenting device and recording device.
Figure 13:
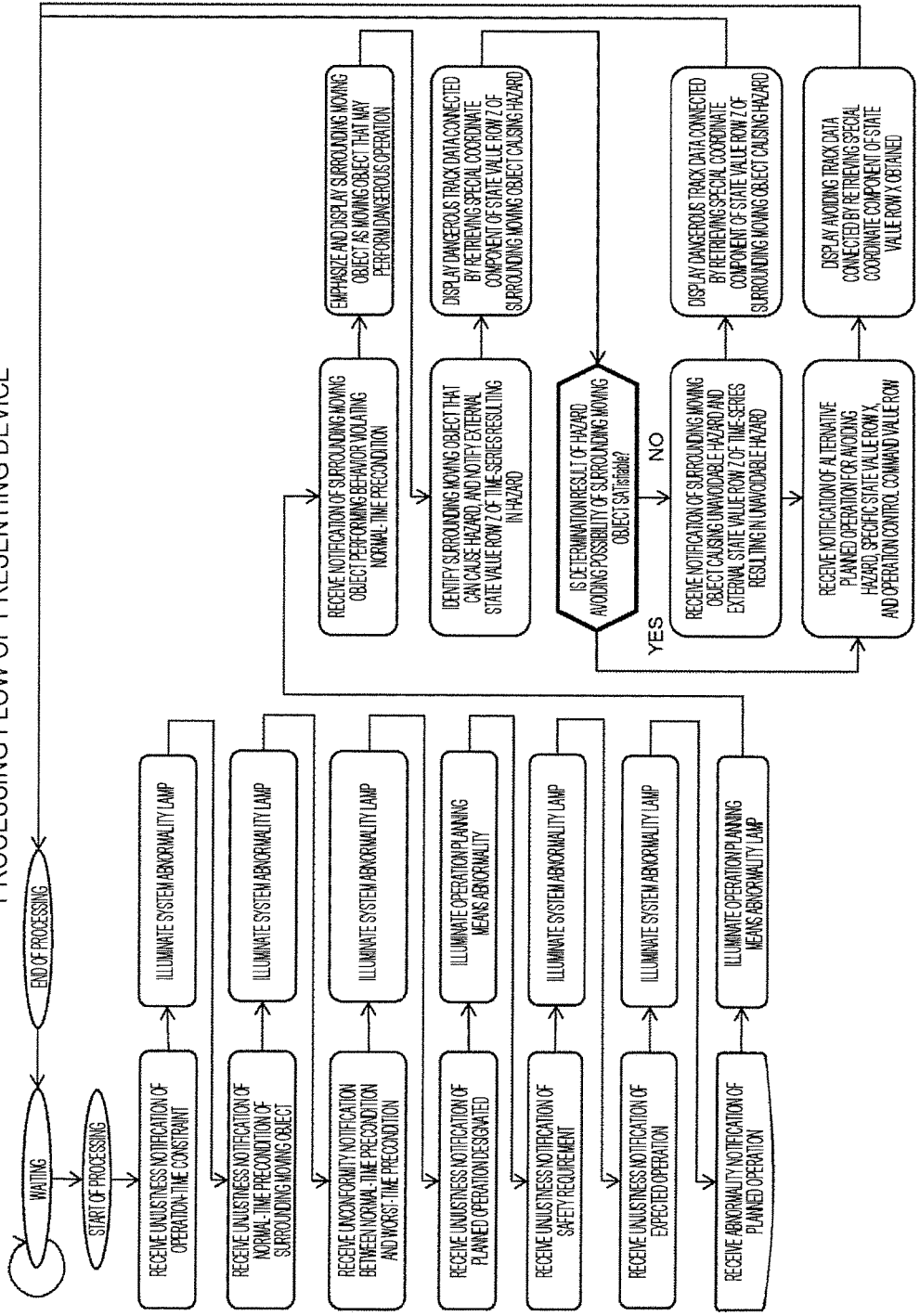
FIG. 13 illustrates processing flow of presenting device.
Figure 14:
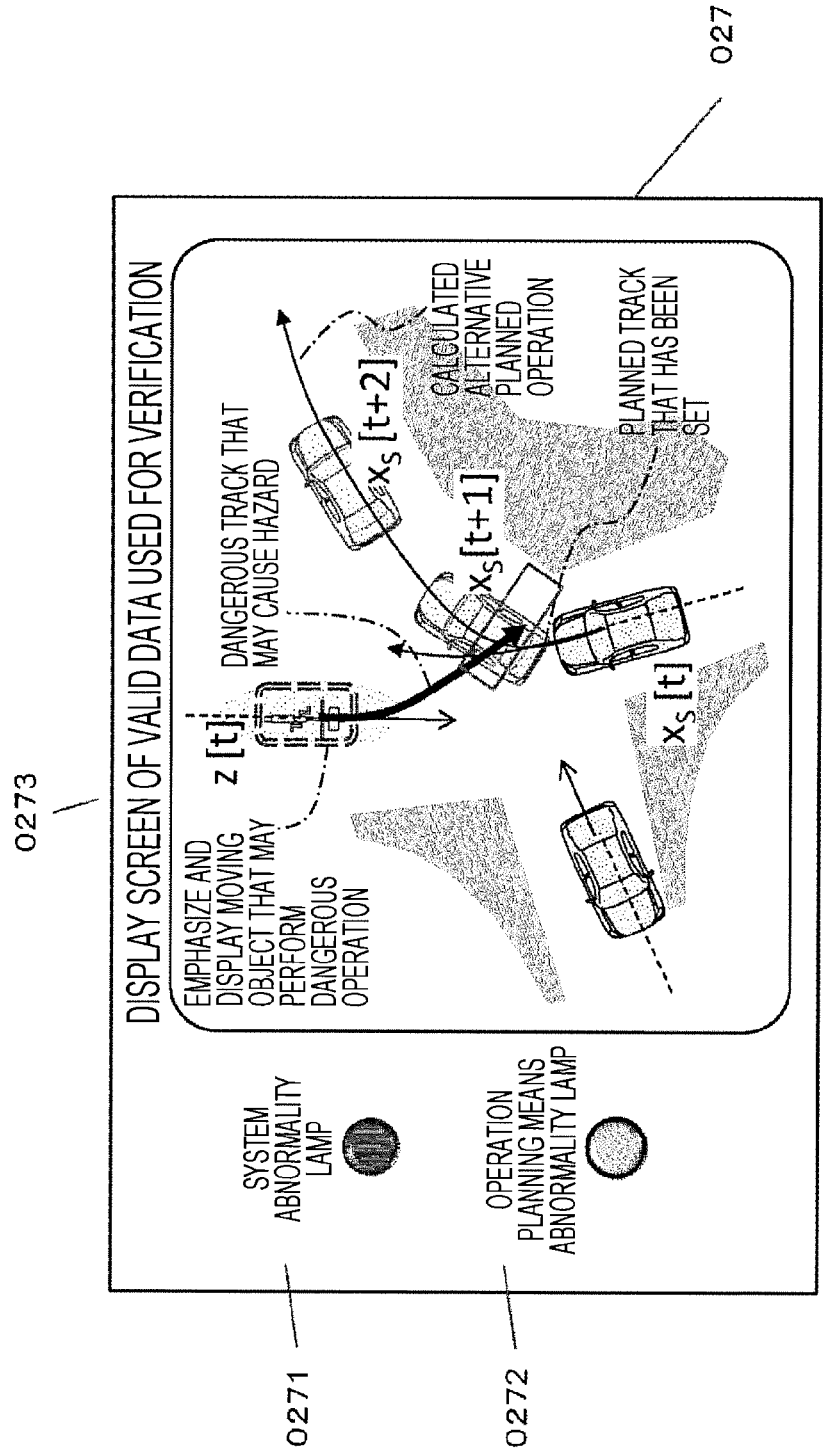
FIG. 14 illustrates configuration of display screen of presenting device.

FIG. 12 illustrates a configuration example in which the autonomous control device 02 and the autonomous system 01 having the autonomous operation verification device 02 disclosed in FIG. 1 outputs determination processing flow performed in the autonomous operation verification device 03 and notification information to a presenting device and the like having an external appearance as shown in FIG. 14 in accordance with the processing flow as shown in FIG. 13.

When the presenting device receives an unjustness notification of operation-time constraint, an unjustness notification of normal-time precondition of a surrounding moving object, a notification of inconformity between normal-time precondition and worst-time precondition, an unjustness notification of safety requirement, and an unjustness notification of expected operation as shown in FIG. 13, processing for illuminating a system abnormality lamp 0271 is executed.

When receiving the unjustness notification of the designated planned operation or the abnormality notification of the planned operation, the lamp 0272 above the operation planning means may be illuminated, and if necessary, the autonomous control device 02 may perform abnormality-time stop processing.

When receiving notification of the surrounding moving object violating the normal-time precondition, it is highlighted and displayed as the moving object with a possibility of dangerous operation on the display screen 0273 in the presenting device.

When receiving the information about the surrounding moving object determined to cause the hazard and the notification of the external state value sequence of the time series sequence resulting in the hazard, the dangerous track data obtained by retrieving and connecting the spatial coordinate component of the state value sequence Z of the surrounding moving object resulting in the hazard is displayed on the display screen 0273 in the presenting device.

Lastly, the notification of decision result on the existence of alternative planned operation to avoid hazard due to the surrounding moving object is referred to. When there is no alternative planned operation, the surrounding moving object causing hazard which is impossible to avoid is identified, the dangerous track data obtained by retrieving and connecting the spatial coordinate component of the state value sequence of the surrounding moving object resulting in in the hazard is displayed on the display screen 0273 in the presenting device.

On the contrary, when there is an alternative planned operation, the avoidance track data obtained by retrieving and connecting the spatial coordinate component of the internal state value sequence forming a part of the satisfying solution is displayed on the display screen 0273 in the presenting device.

The first meaning of the presenting device is to display, in the process that guarantees the operation safety of the autonomous system which is completely processed by software, the computation process related to the hazard risk determination inside the autonomous operation verification device and the control of the system in question disclosed in the present invention in such a manner that it can be observed from the outside, and more particularly, it can be observed by a person in charge of verification and authentication of the autonomous system.

The second meaning of the presenting device is to provide means for realizing the function to resolve through communication with the surrounding moving object in the operation situation where the expected operation cannot be satisfied within the range where the system in question can make determination.

It has been already said that the surrounding moving object decides the movement intention and future track with free will and the system in question cannot know its moving intention. However, from the surrounding moving object, it is impossible to observe the moving intention of the system in question or the future track. Therefore, in a congestion situation where a large number of surrounding moving objects are present, a planned operation that satisfies the expected operation of the system in question is difficult to be calculated upon applying a limitation in which the system in question can perform control, and there actually exists a situation that leads to a deadlock. Under such situation, the specific notification information about the hazard determination result which is deemed by the autonomous operation verification device to hinder smooth operation of the system in question is output to the presenting device, and the surrounding moving object is promoted to take an avoidance operation based on the notification, or a traffic rule is established, so that such situation can be solved.

The presenting device shown in FIG. 14 is primarily configured to perform the second meaning, and FIG. 14 shows the screen presented to the surrounding moving object via the processing flow shown in FIG. 14 using the information notified in FIG. 9. Information about the surrounding moving object that is determined to have a possibility of dangerous operation, which is determined to violate the normal-time precondition by the display screen 0273 in which the system abnormality lamp 0271 and the lamp 0272 of the operation planning means abnormality are useful for showing, to the outside, that there is a possibility that the system in question cannot perform correct operation, the specific track resulting in hazard, and the alternative planned operation to be executed by the system in question based on the above are output to the presenting device 027.

INDUSTRIAL APPLICABILITY

The present invention can be used for a fully autonomous vehicle that operates in an open environment including public roads, and for unmanned taxis and unmanned car rental services driving to the standby positions of passengers. The present invention can be used for an automobile having an auto cruise function and a collision avoidance function that run at a constant speed without touching the running vehicle in the vicinity. The present invention can be used for a work machine that is controlled through a communication route in a remote place such as a mine, a deep subsurface, and a sea floor, and that is operated by autonomously determining to satisfy a constraint on safety in terms of work.

REFERENCE SIGNS LIST

01 autonomous system
02 autonomous control device
021 internal state measurement means
022 external state measurement means
023 operation-time constraint
024 operation-time precondition
025 expected operation
026 safety requirement
027 presenting device
0271 system abnormality lamp
0272 lamp above operation planning means
0273 display screen of valid data used for verification
028 driving device
03 autonomous operation verification device
031 constraint form conversion unit
032 satisfiability determination unit
033 operation planning means
034 pre-verification planned operation
035 verified planned operation
036 control device
04 recording device

The invention claimed is:

1. An autonomous system of autonomous vehicles, comprising:
a processor configured to:
measure an internal state value of a vehicle;
measure an external state of the vehicle;
set an operation-time constraint limiting a possible range that could be taken by the internal state value until a predetermined time point;
set an operation-time precondition limiting a possible range that could be taken by the external state until a predetermined time point by using the external state;
set a safety requirement constraining a relationship between the internal state and the external state;
set an expected operation for commanding an operation to be executed by the system in question;

calculate a planned operation for the purpose of achieving the expected operation;

convert all of the operation-time constraint, the operation-time precondition, the safety requirement, the expected operation, the planned operation into a constraint form with a quantifier; and determine whether there is a satisfying solution for the constraint form with the quantifier, wherein the processor provides a satisfiability determination solution of the constraint form with the quantifier when the vehicle is operating based on the planned operation, and wherein the autonomous system further comprises a presenting device having a display screen and configured to:

illuminate an abnormality lamp in a case where there is no safety of the planned operation;

display, on the display screen, a target performing a dangerous operation violating the operation-time precondition on the screen; and display, on the display screen, an alternative planned operation that satisfies the safety requirement under the operation-time precondition.

2. The autonomous system according to claim 1, wherein the processor is further configured to:

determine whether there is any satisfying solution of the expected operation and the safety requirement;

determine whether there is any satisfying solution of the external state and the operation-time precondition, and identify the target performing the dangerous operation violating the operation-time precondition;

determine whether there is any time series sequence value in the outside state violating the safety requirement under the operation-time precondition; and determine whether there is any alternative planned operation satisfying the safety requirement under the operation-time precondition.

3. The autonomous system according to claim 2, wherein the processor is configured to notify:

safety of the planned operation based on a result of the achieving possibility determination function;

a target for performing a dangerous operation based on a result of the hazard factor identification function;

a hazard factor based on a result of the hazard occurrence possibility determination function; and an alternative planned operation based on a result of the hazard avoidance possibility determination function.

4. The autonomous system according to claim 3, wherein every time data of the constraint form with the quantifier is received, the processor is configured to output data of results determined by the processor based on received data, together with a registration time point and a valid period of the data, to a recording device.

5. The autonomous system according to claim 2, wherein the processor is configured to replace the planned operation with the alternative planned operation to satisfy the safety requirement in a case where the alternative planned operation is obtained.

* * * * *